(12) United States Patent
Gharagozloo et al.

(10) Patent No.: US 12,719,398 B2
(45) Date of Patent: Aug. 25, 2026

(54) INDEPENDENT MITIGATION FOR ISOLATION OF ELECTRIC MOTOR

(71) Applicant: Pratt & Whitney Canada Corp., Longueuil (CA)

(72) Inventors: Alireza Gharagozloo, Boucherville (CA); Michael Hanna, Beaconsfield (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 100 days.

(21) Appl. No.: 18/341,257

(22) Filed: Jun. 26, 2023

(65) Prior Publication Data

US 2024/0429850 A1 Dec. 26, 2024

(51) Int. Cl.

| | |
|---|---|
| ***H02P 29/00*** | (2016.01) |
| ***B64C 11/30*** | (2006.01) |
| ***B64C 13/04*** | (2006.01) |
| ***B64D 27/33*** | (2024.01) |
| ***B64D 31/04*** | (2006.01) |
| ***B64D 31/06*** | (2024.01) |
| ***B64D 31/18*** | (2024.01) |
| ***B64D 35/025*** | (2025.01) |
| ***F02C 6/20*** | (2006.01) |
| ***F02C 9/56*** | (2006.01) |
| ***F02C 9/58*** | (2006.01) |

(52) U.S. Cl.

CPC ........ *H02P 29/0027* (2013.01); *B64C 11/305* (2013.01); *B64C 13/0421* (2018.01); *B64C 13/0423* (2018.01); *B64D 27/33* (2024.01); *B64D 31/04* (2013.01); *B64D 31/06* (2013.01); *B64D 31/18* (2024.01); *B64D 35/025* (2024.01); *F02C 6/20* (2013.01); *F02C 9/56* (2013.01); *F02C 9/58* (2013.01)

(58) Field of Classification Search

CPC ............ B64C 13/0421; B64C 13/0423; B64C 11/305; H02P 29/0027; B64D 31/18; B64D 27/33; F02C 6/20; F02C 9/56; F02C 9/58

See application file for complete search history.

(56) References Cited

U.S. PATENT DOCUMENTS 4,696,445 A * 9/1987 Wright ................ B64C 13/0421 244/236
11,560,237 B2 1/2023 Zoppitelli et al.
(Continued)

FOREIGN PATENT DOCUMENTS

CA 3059843 A1 5/2020
CA 3119004 A1 11/2021
(Continued)

OTHER PUBLICATIONS

Extended European Search Report for European Application No. 24184716.9 mailed Nov. 8, 2024.

*Primary Examiner* — Jason H Duger

(74) *Attorney, Agent, or Firm* — Carlson, Gaskey & Olds, P.C.

(57) ABSTRACT

A hybrid electric aircraft propulsion system includes both a turbine engine and an electric motor. A power management system controls operation of the electric motor and a pitch angle of a propeller associated with the propulsion system. A disconnect switch is provided to isolate the electric motor by mechanical decoupling the electric motor from the aircraft propulsion system.

14 Claims, 4 Drawing Sheets

(56) References Cited

U.S. PATENT DOCUMENTS

| | | | | |
|---|---|---|---|---|
| 2019/0323426 | A1* | 10/2019 | Mackin | F02C 3/04 |
| 2020/0277064 | A1 | 9/2020 | Thomassin et al. | |
| 2021/0101691 | A1 | 4/2021 | Mark et al. | |
| 2022/0009615 | A1* | 1/2022 | Mark | B64D 35/023 |
| 2022/0234748 | A1 | 7/2022 | Mark et al. | |

FOREIGN PATENT DOCUMENTS

| | | | |
|---|---|---|---|
| CA | 3124414 | A1 | 1/2022 |
| EP | 2404775 | B1 | 10/2014 |

* cited by examiner 20
24
26
28
30
35
40
42
37
RGB
36
38
44
46
DISCONNECT
ELECTRICAL MOTOR
32
ELECTRIC SYSTEM
22
CONTROLLER
54
COCKPIT DISPLAY
56
84
PROPELLER CONTROL
52
POWER LEVER
50
ELECTRIC MOTOR DISCONNECT SWITCH
48
86
34
A

INDEPENDENT MITIGATION FOR ISOLATION OF ELECTRIC MOTOR

TECHNICAL FIELD

The present disclosure relates generally to a mitigation system for mechanically isolating an aircraft electric motor.

BACKGROUND

Aircraft engine manufacturers are integrating electric motor into aircraft propulsion systems. The integration of electric devices and motors into an aircraft propulsion system create additional contingencies. In the event of a fault involving the electric motor, the electric motor may be mechanically isolated from the propulsion system. Independent means of isolating the electric motor by a pilot may be utilized to safeguard engine and aircraft systems. While current propulsion systems includes redundant systems to address contingencies, aircraft engine manufactures continuously seek improvements in engine performance, control, and propulsive efficiency.

SUMMARY

A power management system for a hybrid electric aircraft propulsion system including a turbine engine and an electric motor, the power management system according to an exemplary embodiment of this disclosure, among other possible things includes a controller that includes a memory device that is coupled to a processor, the memory includes a stored program with instructions executable by the processor, the stored program includes instructions for operating the electric motor. A propeller control is configured to generate a signal that is communicated to the controller for controlling a pitch angle of a propeller that is associated with the aircraft propulsion system. A disconnect switch is configured to trigger a mechanical decoupling device to decouple the electric motor from the aircraft propulsion system.

An aircraft propulsion system according to another exemplary embodiment of this disclosure, among other possible things includes a turbine engine that is configured to generate a first mechanical power output from a combustion process to drive a propeller, an electric motor that is configured to generate a second mechanical power output to drive the propeller, a selectively operable mechanical decoupling device for mechanically decoupling the electric motor from the propeller, a controller that includes a memory device that is coupled to a processor, the memory includes a stored program with instructions executable by the processor, the stored program includes instructions for operating the turbine engine and the electric motor, a propeller control that is configured to generate a signal that is communicated to the controller for controlling a pitch angle of the propeller, and a disconnect switch that is configured to trigger the selectively operable mechanical decoupling device to mechanically decouple the electric motor from the propeller.

A method of controlling operation of a hybrid electric aircraft propulsion system including a turbine engine and an electric motor, the method according to another exemplary embodiment of this disclosure, among other possible things includes monitoring an engine operating condition with at least one sensing element, providing a propeller control that is actuatable for controlling a pitch angle of a propeller, providing a disconnect switch that is actuatable to mechanically decouple an electric motor from the propeller, and configuring the propeller control to provide for changing the pitch angle to a feathered position and the disconnect switch to mechanically decouple the electric motor from the propeller in response to the monitored engine operating condition indicating operation of the electric motor outside of a predefined operating condition.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
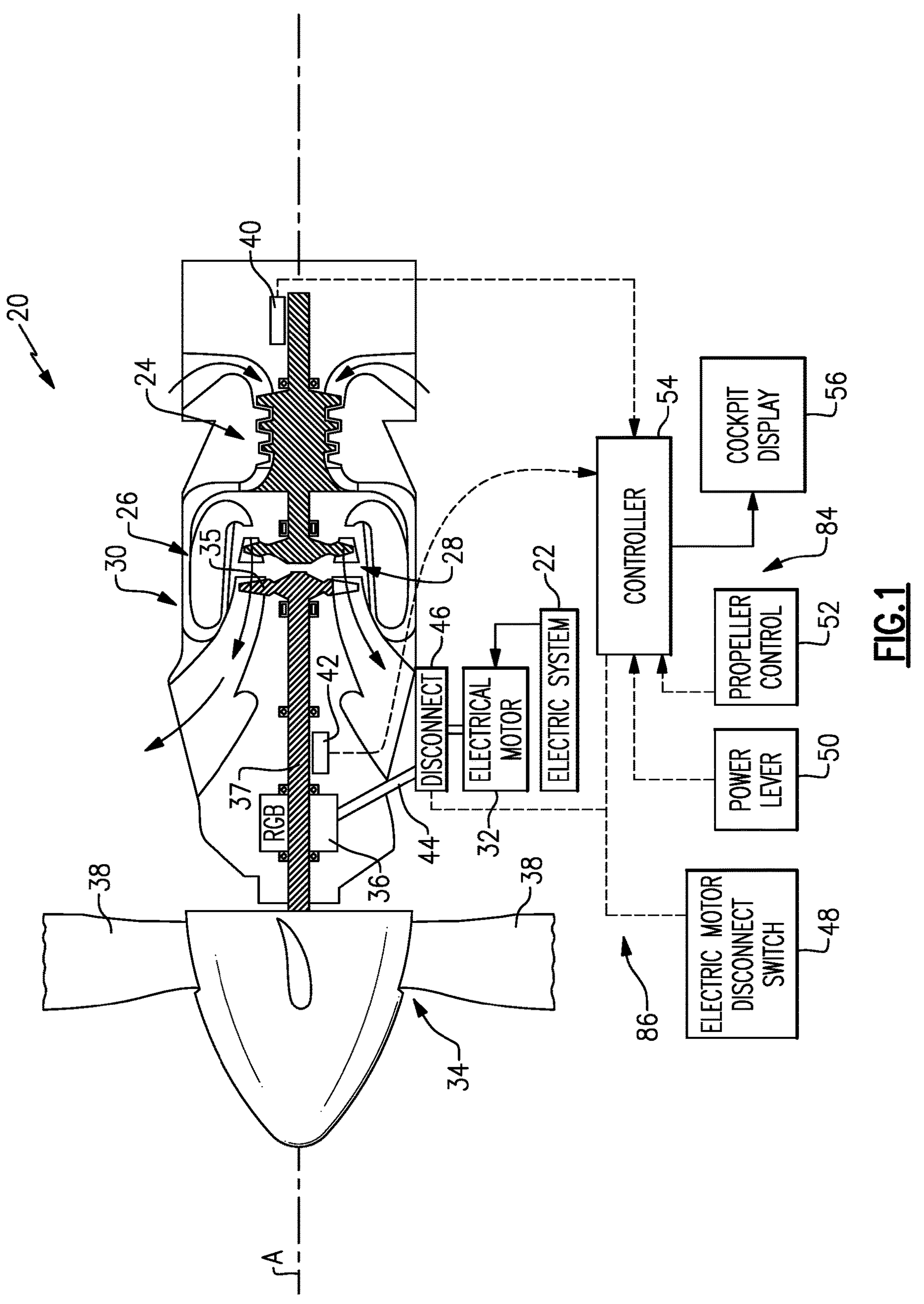
FIG. 1 is a schematic view of an example aircraft propulsion system embodiment.

FIG. 1 schematically illustrates a hybrid electric aircraft propulsion system 20 that includes a turbine engine 30 and an electric motor 32. The example propulsion system 20 includes two independent means for a pilot to isolate the electric motor 32 in response to a detected fault condition. Isolation of the electric motor 32 is provided to mitigate effects on the aircraft electrical system 22 and the propulsion system 20.

In one disclosed example, the turbine engine 30 is a turboprop engine that drives a propeller 34. The turbine engine includes a compressor section 24, a combustor section 26 and a turbine section 28 arranged along an engine axis A. The compressor section 24 drives air for compression and communication into the combustor section 26. In the combustor section 26, the compressed air is mixed with fuel and ignited to generate an exhaust gas flow that expands through the turbine section 28 and is exhausted to the ambient environment. The example turbine section 28 is coupled to drive the compressor section 24.

A power turbine 35 is configured to drive a shaft 37 that is coupled to drive the propeller 34 through a gearbox 36. The shaft 37 driven by the power turbine 35 provides a first mechanical power output that drives the propeller 34. The electric motor 32 is coupled to the gearbox 36 through a mechanical coupling 44 to provide a second mechanical power output that drives the propeller 34. The mechanical coupling 44 is shown schematically between the electric motor 32 and the gearbox 36, but may be coupled to provide the second mechanical power output to drive the propeller 34 in a different manner and remain within the contemplation and scope of this disclosure.

Moreover, although depicted as a turboprop turbine engine in the disclosed non-limiting embodiment, it should be understood that the concepts described herein are not limited to use with turboprops as the teachings may be applied to other types of gas turbine engines.

An electrical system 22 provides electric energy to operate the electric motor 32. The electrical system 22 may include battery systems, generator systems and the electronics required to manage and control power generation and communication to the electric motor 32. Although the electric motor 22 is disclosed and described by way of example, the electric motor 32 may be a motor/generator that can provide both the addition of a mechanical drive input and the generation of electric energy. Additionally, the electric motor 32 is disclosed schematically as being coupled to the gearbox 36. However, the electric motor 32 may be mechanically coupled in other locations to provide the second drive input to the propeller 34.

A controller 54 is schematically shown and governs operation of the propulsion system 20. The controller 54 receives inputs from sensing devices and pilot operated controls and generates signals utilized to control both the turbine engine 30 and the electric motor 32. In one example embodiment, a first sensing device 40 and a second sensing device 42 are located within the propulsion system 20 and provide information indicative of one or more engine operating parameters. Engine operating parameters may include, among other possible things, torque, shaft speed, current, voltage and temperature. The first sensing device 40 and the second sensing device 42 monitor an engine operating parameter and communicates that information to the controller 54. The controller 54 utilizes information from the first and second sensors 40, 42 to control and adjust operation of the propulsion system 20.

The controller 54 may provide information to a cockpit display 56 for communicating engine operating parameters to a pilot. The display 56 may provide specific information on the each monitored engine parameter and/or simply confirm operation within desired and predefined operating parameters.

A power lever 50 and a propeller control 52 provide control of the propulsion system 20. The power lever 50 generates signals utilized by the controller 54 to adjust engine power and thrust output. The propeller control 52 provides pitch adjustment for the blades 38 of the propeller 34.

Operation of the example propulsion system 20 includes a means for isolating the electric motor 32 in case of a fault condition. Isolation of the electric motor 32 is utilized to protect the propulsion system 20 and the aircraft electrical system 22 coupled to the electric motor 32. In this disclosure, isolation of the electric motor 32 includes decoupling such that no mechanical input or output is provided to or provided by the electric motor 32. Physical separation of the electric motor 32 is not required. Moreover, where the electric motor 32 is a motor/generator, it may remain coupled in another manner that is not coupled to the propulsion system and prevents back driving.

A fault condition in the electric motor 32 may reduce or prevent generation of the second mechanical power output that in turn impacts propulsion system operation. Moreover, continued rotation of the electric motor 32 by way of the mechanical coupling through the gearbox 36 can generate arcing or uncontrolled generation of electric energy. Accordingly, the example propulsion system 20 includes isolation means to stop rotation of the electric motor 32 and to mechanically decouple the electric motor 32 from the propeller 34 and gearbox 36.

In one example embodiment of the disclosed propulsion system 20, two separate and independent mitigation paths are provided. A first mitigation path 84 is provided by operation of the propeller control 52 to adjust a pitch of the blades 38 to a feathered configuration. A second mitigation path 86 is provided by operation of a disconnect switch 48 that prompts actuation of a disconnect device 46 to mechanically decouple the electric motor 32 from the propeller 34 and gearbox 36. In one example embodiment, the disconnect device 46 comprises an actuatable clutch disposed between the electric motor 32 and the gearbox 36.

Figures 2, 3:
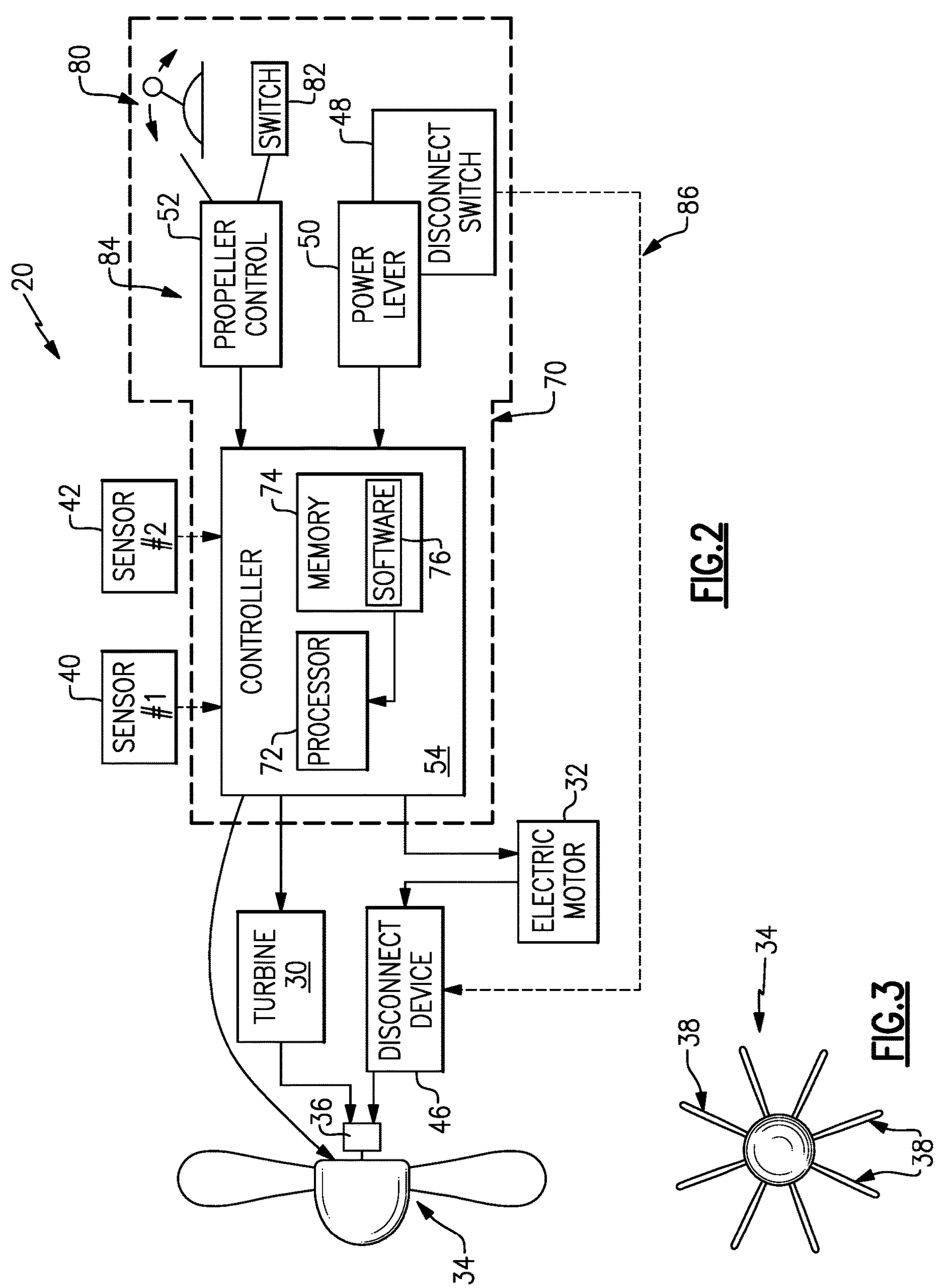
FIG. 2 is a schematic view of an example aircraft propulsion system and power management system.
FIG. 3 is a schematic view of an example propeller in a feathered configuration.

Referring to FIG. 2, with continued reference to FIG. 1, a power management system 70 of the propulsion system 20 is shown schematically. The power management system 70 includes, among other things, the controller 54, the propeller control 52, the power lever 50 and the disconnect switch 48.

The example controller 54 includes a processor 72 and a memory device 74 configured to store computer executable software instructions 76. The processor 72 is configured to execute the instructions embodied in the software instructions 76.

The example controller 54 may be a separate controller dedicated to the power management system 70 are may be implemented as part of full-authority digital engine control (FADEC) or similar device, including an electronic engine control unit (EEC), engine control unite (ECU), electronic propeller control, propeller controller, electric motor controller (EMC), motor controller (MC), electric powertrain controller (EPC) and/or similar control devices and systems. Accordingly, the example controller 54 is a device and system for performing necessary computing or calculation operations of the power management system 70.

The example controller 54 includes, at a minimum, the processor 72 and the memory device 74. The memory device 74 provides for the storage of the software instructions 76. The software instructions 74 may be embodied in a computer program that uses data obtained from the first and second sensors 40, 42 along with data stored in the memory device 74 that may be required for its execution.

Instructions for configuring and operating the processor 72 are embodied in the software instructions 76 that may be stored on any combination of computer readable medium. The computer readable medium may be embodied in structures such as, but is not limited to, any type of disk including floppy disks, optical disks, CD-ROMs, magnetic-optical disks, read-only memories (ROMs), random access memories (RAMS), EPROMs, EEPROMs, magnetic or optical cards, application specific integrated circuits (ASICs), or any type of media suitable for storing electronic instructions, and each coupled to a computer system bus. The disclosed computer readable medium may be a non-transitory medium such as those examples provided. Moreover, the disclosed memory device 74, may include any one or combination of volatile memory elements (e.g., random access memory (RAM, such as DRAM, SRAM, SDRAM, VRAM, etc.) and/or nonvolatile memory elements (e.g., ROM, hard drive, tape, CD-ROM, etc.).

The software instructions 76 in the memory device 74 may include one or more separate programs, each of which includes an ordered listing of executable instructions for implementing logical functions. The disclosed controller 54 is configured to execute the software instructions 76 stored within the memory device 74, to communicate data to and from the memory device 28, and to generally control operations pursuant to the software instructions 76. Although the example controller 54 and propeller control 52 are shown schematically shown a separate unit, the propeller control 52 and the controller 54 may be a single combined controller. Moreover, although the example power management system 70 is show schematically with a separate controller 54 and propeller control 52, the features of the controller 54 and the propeller control 52 may be combined into a single control unit. Moreover, although the example power management system is disclosed by way of example as including features for mitigating effects of the electric motor 32, other control features as are necessary and utilized for control and operation of the propulsion system would be included and are within the scope and contemplation of this disclosure.

Referring to FIG. 3 with continued reference to FIG. 2, the propeller control 52 provides a signal to the controller 54 that commands actuation of the propeller 34 and specifically commands changes in a pitch of the blades 38. The first mitigation path 84 is configured to enable the pilot to use the power control 52 to set the pitch of the blades 38 to a featured configuration as shown in FIG. 3. The example feathered configuration arranges the blades 38 such that little to no rotation of the propeller 34 occurs. The pitch will arrange the blades 38 to have a minimal forward cross-section such that air passing through the blades 38 generates little to no rotation. The reduced rotation of the propeller 34 stops or slows rotation of the electric motor 32 to eliminate or reduce any electrical interaction that may be caused by rotation.

The example propeller control 52 may be embodied in a control lever 80 that is actuatable by a pilot. The example propeller control 52 may be also be embodied as a feathering switch 82 that automatically sets the blades 38 to the feathered configuration that stops or minimizes rotation of the propeller 34.

The second mitigation path 86 includes the disconnect switch 48 that is directly coupled to control the disconnect device 46. The disconnect device 46 provides for the mechanical decoupling of the electric motor 32 from the aircraft electrical system 22. Decoupling of the electric motor 32 prevents the introduction of electric power generated by a back driven electric motor 32 into the aircraft electrical system 22. In one example embodiment, the disconnect switch 48 operates independent of the controller 54 to provide the separate and independent second mitigation path 86.

Figure 4:
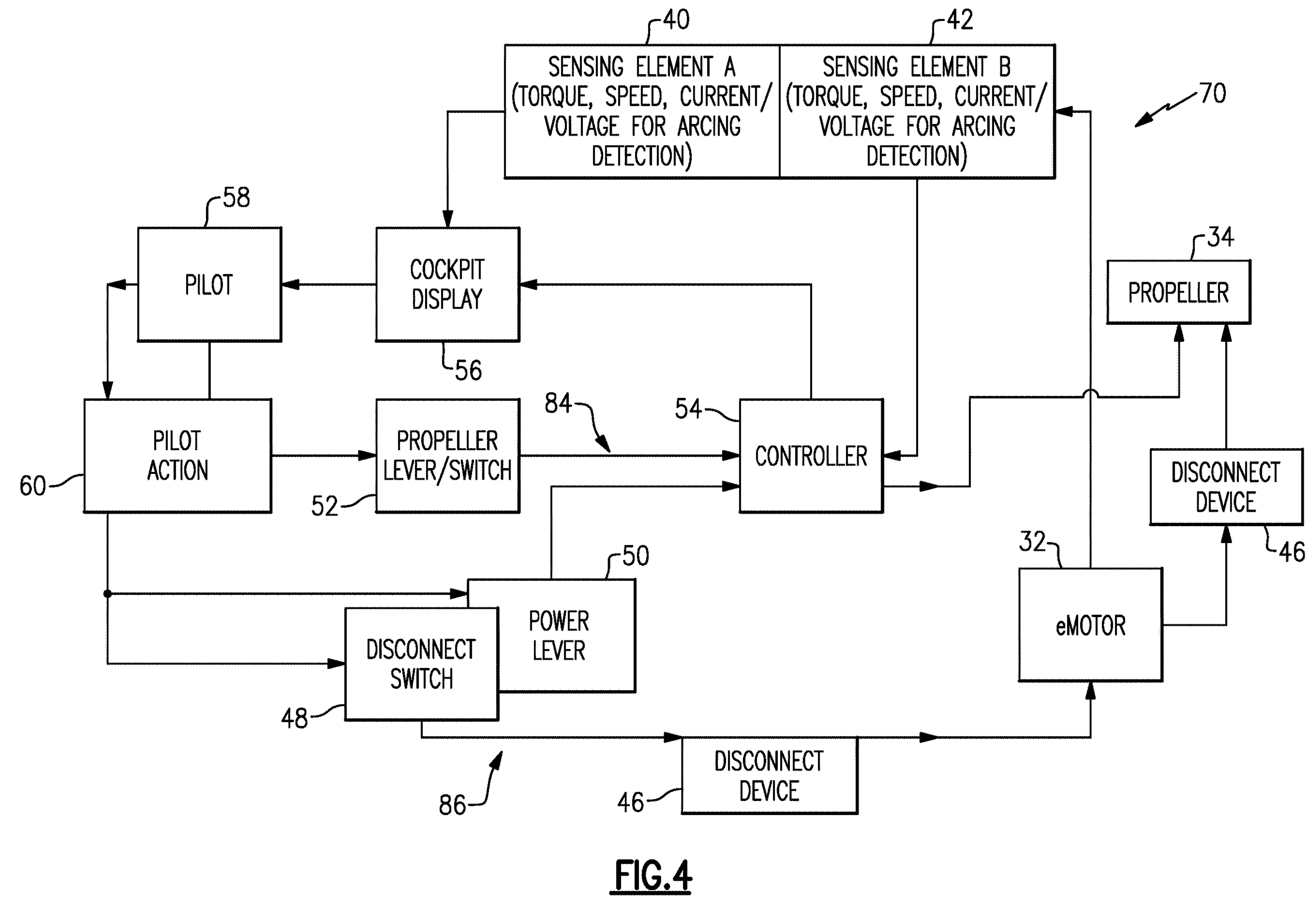
FIG. 4 is a schematic view of the example power management system of FIG. 2.

Referring to FIG. 4, with continued reference to FIG. 2, the example power management system 70 is schematically shown and illustrates the independent mitigation path 84, 86. In one example embodiment, the disconnect switch 48 is mounted to the power lever 50 to provide easy access to a pilot 58. In one example embodiment, the disconnect switch 48 is actuatable independent of a position of the power lever 50. In another example embodiment, the disconnect switch 48 may be automatically actuated based on a position of the power lever 50. For example, the disconnect switch 48 may be automatically actuated when the power lever 50 is moved to an engine idle or off position. Other power lever positions may be utilized for triggering actuation of the disconnect switch 48. The example disconnect switch 48 may be embodied as a micro-switch. The disconnect switch 48 may further be embodied as other switch types and remain within the contemplation and scope of this disclosure.

In one example operational embodiment, the first and second sensors 40, 42 monitor at least one engine operating parameter and communicate that information to the controller 54. The controller 54 process information from the sensors 40, 42 and communicates that information to the pilot 58 by way of the display 56 or other communication device. The information may be an alert, or simply be data that indicates the condition of the operating parameter. In response to the information indicating operation of the electric motor 32 outside of desired operating ranges, the pilot 58 may choose to act schematically indicated at 60 to isolate the electric motor 32. The power management system 70 is configured to enable the pilot 58 to isolate the electric motor 32 with the first mitigation path 84 by moving the blades 38 of the propeller 34 to the feathered configuration. In the featured configuration, rotation of the propeller 34 is either stopped or slowed to reduce or prevent continued rotation of the electric motor 32.

The power management system 70 is further configured to enable isolation of the electric motor 32 through actuation of the disconnect switch 48. Upon actuation of the disconnect switch 48, the disconnect device 46 is activated and the mechanical connection between the electric motor 32 and the gearbox 36 and propeller 34 is disabled. The disconnect device 46 may be any electrical and/or mechanical device that is capable of mechanically decoupling the driving connection between the propeller 34 and the electric motor 32. One or both of the first and second mitigation path 84, 86 may be separately and independently engaged and utilized by the pilot to isolate the electric motor 32.

Figure 5:
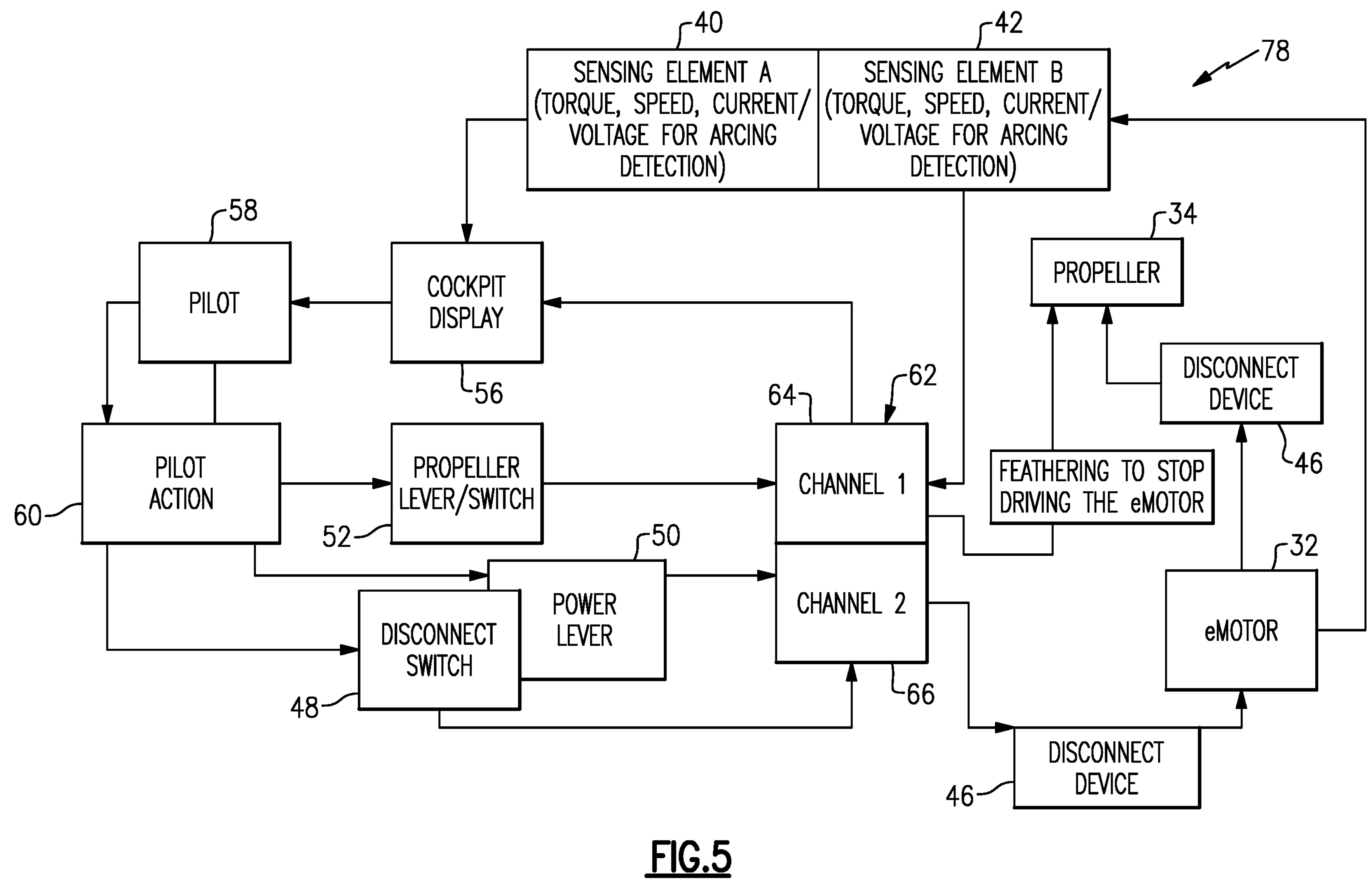
FIG. 5 is a schematic view of another example power management system.

Referring to FIG. 5, another example power management system 78 is schematically shown and includes a dual controller 62 having a first channel 64 and a second channel 66. The dual controller 62 provides redundancy in controller operation to add additional safeguards to operation.

In the example power management system 78, the disconnect switch 48 operates through one of the first and second channels 64, 66 and the propeller control 52 operates through the other of the first and second channels 64, 66. In one example embodiment, the propeller control 52 operates through the first channel 64 and the disconnect switch 48 operates through the second channel 66. Operation through different ones of the first and second channels 64, 66 provide separate and independent signal paths that maintain the separate and independent first and second mitigation paths 84, 86 for mechanically isolating the electric motor 32. The independent mitigation paths are without any one single failure point to provide robust electric motor isolation.

The example power management system provides separate and independent electric motor mitigation paths without complex electronics and programming to provide robust electric motor mechanical isolation and mitigation.

A power management system for a hybrid electric aircraft propulsion system 20 including a turbine engine 30 and an electric motor 32, the power management system according to an exemplary embodiment of this disclosure, among other possible things includes a controller 54 that includes a memory device 74 that is coupled to a processor 72, the memory includes a stored program with instructions executable by the processor 72, the stored program includes instructions for operating the electric motor 32. A propeller control 52 is configured to generate a signal that is communicated to the controller 54 for controlling a pitch angle of a propeller 34 that is associated with the aircraft propulsion system 20. A disconnect switch 48 is configured to trigger a mechanical decoupling device 46 to decouple the electric motor 32 from the aircraft propulsion system 20.

In a further embodiment of the foregoing, the power management system includes a power control lever that generates a signal that is communicated to the controller 54 for controlling operation of the turbine engine 30 and the electric motor 32. The disconnect switch 48 is mounted to the power control lever 50.

In a further embodiment of any of the foregoing power management systems, the disconnect switch 48 is actuatable independent of a position of the power control lever 50.

In a further embodiment of any of the foregoing power management systems, the disconnect switch 48 is automatically actuated based on a position of the power control lever 50.

In a further embodiment of any of the foregoing power management systems, the mechanical decoupling device 46 includes an actuatable clutch.

In a further embodiment of any of the foregoing power management systems, the propeller control 52 includes a lever 80 that is movable to change the pitch angle of the propeller 34 to a feathered position.

In a further embodiment of any of the foregoing power management systems, the propeller control 52 includes a feathering switch 82 that is actuatable to send a signal to the controller 54 for automatically changing the pitch angle of the propeller 34 to a featured position.

In a further embodiment of any of the foregoing power management systems, the controller 54 includes a dual controller 62 with a first channel 64 and a second channel 66. A signal from the disconnect switch 48 and a signal from the propeller control 52 are provided to separate ones of the first channel 64 and the second channel 66 to provide separate and independent signal paths for decoupling the electric motor 32 and setting the pitch angle of the propeller 34.

In a further embodiment of any of the foregoing, the power management systems further include at least one sensing element that is configured to monitor at least one engine operating parameter.

An aircraft propulsion system according to another exemplary embodiment of this disclosure, among other possible things includes a turbine engine 30 that is configured to generate a first mechanical power output from a combustion process to drive a propeller 34, an electric motor 32 that is configured to generate a second mechanical power output to drive the propeller 34, a selectively operable mechanical decoupling device for mechanically decoupling the electric motor 32 from the propeller 34, a controller 54 that includes a memory device 74 that is coupled to a processor 72, the memory includes a stored program with instructions executable by the processor 72, the stored program includes instructions for operating the turbine engine 30 and the electric motor 32, a propeller 34 control 52 that is configured to generate a signal that is communicated to the controller 54 for controlling a pitch angle of the propeller 34, and a disconnect switch 48 that is configured to trigger the selectively operable mechanical decoupling device to mechanically decouple the electric motor 32 from the propeller 34.

In a further embodiment of the foregoing, the aircraft propulsion system includes a power control lever 50 that generates a signal that is communicated to the controller 54 for controlling operation of the turbine engine 30 and the electric motor 32. The disconnect switch 48 is mounted to the power control lever 50.

In a further embodiment of any of the foregoing aircraft propulsion systems, the disconnect switch 48 is actuatable independent of a position of the power control lever 50.

In a further embodiment of any of the foregoing aircraft propulsion systems, the disconnect switch 48 is automatically actuated based on a position of the power control lever 50.

In a further embodiment of any of the foregoing aircraft propulsion systems, the propeller control 52 is actuatable to change the pitch angle of the propeller 34 to a feathered position.

In a further embodiment of any of the foregoing aircraft propulsion systems, the controller 54 includes a dual controller 62 with a first channel 64 and a second channel 66. A signal from the disconnect switch 48 and a signal from the propeller control 52 are provided to separate ones of the first channel 64 and the second channel 66 to provide separate and independent signal paths for decoupling the electric motor 32 and setting the pitch angle of the propeller 34.

In a further embodiment of any of the foregoing, the aircraft propulsion systems further includes at least one sensing element that is configured to monitor at least one engine operating parameter.

A method of controlling operation of a hybrid electric aircraft propulsion system including a turbine engine 30 and an electric motor 32, the method according to another exemplary embodiment of this disclosure, among other possible things includes monitoring an engine operating condition with at least one sensing element, providing a propeller control 52 that is actuatable for controlling a pitch angle of a propeller 34, providing a disconnect switch 48 that is actuatable to mechanically decouple an electric motor 32 from the propeller 34, and configuring the propeller control 52 to provide for changing the pitch angle to a feathered position and the disconnect switch 48 to mechanically decouple the electric motor 32 from the propeller 34 in response to the monitored engine operating condition indicating operation of the electric motor 32 outside of a predefined operating condition.

In a further embodiment of the foregoing method, the disconnect switch 48 is configured to operate automatically to mechanically decouple the electric motor 32 from the propeller 34 in response to movement of a power level to a predefined position.

In a further embodiment of any of the foregoing methods, the propeller control 52 includes a feathering switch 82 and is configured to automatically change the pitch of the propeller 34 to the feathered position.

In a further embodiment of any of the foregoing, the method includes configuring a controller 54 to enable separate and independent actuation of the propeller control 52 to move the propeller 34 to the feathered position and actuation of the disconnect switch 48 to mechanically decouple the electric motor 32 from the propeller 34.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A power management system for a hybrid electric aircraft propulsion system including a turbine engine and an electric motor, the power management system comprising:

a controller including a memory device coupled to a processor, wherein the memory device includes a stored program with instructions executable by the processor, wherein the stored program includes instructions for operating the electric motor;

a propeller control configured to generate a signal communicated to the controller for controlling a pitch angle of a propeller associated with the aircraft propulsion system; and a disconnect switch configured to trigger a mechanical decoupling device to mechanically decouple the electric motor from the aircraft propulsion system, wherein the disconnect switch is configured to trigger the mechanical decoupling independent of the controller; and a power control lever generating a signal communicated to the controller for controlling operation of the turbine engine and the electric motor, wherein the disconnect switch is mounted to the power control lever.

2. The power management system as recited in claim 1, wherein the disconnect switch is actuatable independent of a position of the power control lever.

3. The power management system as recited in claim 1, wherein the disconnect switch is automatically actuated based on a position of the power control lever.

4. The power management system as recited in claim 1, wherein the mechanical decoupling device comprises an actuatable clutch.

5. The power management system as recited in claim 1, wherein the propeller control and the controller are combined as a single controller.

6. The power management system as recited in claim 1, wherein the propeller control comprises a feathering switch that is actuatable to send a signal to the controller for automatically changing the pitch angle of the propeller to a featured position.

7. The power management system as recited in claim 1, wherein a signal from the disconnect switch and a signal from the propeller control are provided to independent signal paths for decoupling the electric motor and setting the pitch angle of the propeller.

8. The power management system as recited in claim 1, further comprising at least one sensing element configured to monitor at least one engine operating parameter.

9. A hybrid electric aircraft propulsion system comprising:

a turbine engine configured to generate a first mechanical power output from a combustion process to drive a propeller;

an electric motor configured to generate a second mechanical power output to drive the propeller;

a selectively operable mechanical decoupling device for mechanically decoupling the electric motor from the propeller;

a power management system comprising:

a controller including a memory device coupled to a processor, wherein the memory includes a stored program with instructions executable by the processor, wherein the stored program includes instructions for operating the turbine engine and the electric motor;

a propeller control configured to generate a signal communicated to the controller for controlling a pitch angle of the propeller;

a disconnect switch configured to trigger the selectively operable mechanical decoupling device to mechanically decouple the electric motor from the aircraft propulsion system, wherein the disconnect switch is configured to trigger the mechanical decoupling independent of the controller; and a power control lever generating a signal communicated to the controller for controlling operation of the turbine engine and the electric motor, wherein the disconnect switch is mounted to the power control lever.

10. The hybrid electric aircraft propulsion system as recited in claim 9, wherein the disconnect switch is actuatable independent of a position of the power control lever.

11. The hybrid electric aircraft propulsion system as recited in claim 9, wherein the disconnect switch is automatically actuated based on a position of the power control lever.

12. The hybrid electric aircraft propulsion system as recited in claim 9, wherein the propeller control is actuatable to change the pitch angle of the propeller to a feathered position.

13. The hybrid electric aircraft propulsion system as recited in claim 9, wherein a signal from the disconnect switch and a signal from the propeller control are provided to independent signal paths for decoupling the electric motor and setting the pitch angle of the propeller.

14. The hybrid electric aircraft propulsion system as recited in claim 9, further comprising at least one sensing element configured to monitor at least one engine operating parameter.

* * * * *